(12) United States Patent
Tang et al.

(10) Patent No.: US 11,804,890 B2
(45) Date of Patent: *Oct. 31, 2023

(54) SYSTEMS AND METHODS FOR UPDATING BEAMFORMING CODEBOOKS FOR ANGLE-OF-ARRIVAL ESTIMATION USING COMPRESSIVE SENSING IN WIRELESS COMMUNICATIONS

(71) Applicant: Samsung Electronics Co., Ltd., Suwon-si (KR)

(72) Inventors: Yanru Tang, San Diego, CA (US); Hongbing Cheng, San Diego, CA (US); Kee-Bong Song, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,290

(22) Filed: Nov. 30, 2021

(65) Prior Publication Data

US 2022/0094419 A1   Mar. 24, 2022

Related U.S. Application Data

(63) Continuation of application No. 16/983,813, filed on Aug. 3, 2020, now Pat. No. 11,616,563.
(Continued)

(51) Int. Cl.
*H04B 7/08*   (2006.01)

(52) U.S. Cl.
CPC .................... *H04B 7/086* (2013.01)

(58) Field of Classification Search
CPC ........ H04B 7/08; H04B 7/086; H04B 7/0897; H04B 7/089
See application file for complete search history.

(56) References Cited

U.S. PATENT DOCUMENTS 7,453,946 B2 * 11/2008 Sondur ............... H04L 25/0226
375/267
7,505,509 B2   3/2009 Tsutsui
(Continued)

FOREIGN PATENT DOCUMENTS

EP   3 588 797 A1   1/2020
WO   2012/052772 A1   4/2012
(Continued)

OTHER PUBLICATIONS

Singh et al. "On the Feasibility of Codebook-Based Beamforming in Millimeter Wave Systems With Multiple Antenna Arrays", May 7, 2015, pp. 2670-2683, IEEE transactions on Wireless Communications, vol. 14, No. 5, May 2015 (Year: 2015).*
(Continued)

*Primary Examiner* — Sophia Vlahos
(74) *Attorney, Agent, or Firm* — Lewis Roca Rothgerber Christie LLP

(57) ABSTRACT

A wireless communication device includes: a processing circuit configured to: receive, from an antenna array during a previous period, a first directional electromagnetic signal including beam sweeping reference symbols of a previous beam sweeping period; compute an estimated combined channel; estimate a dominant angle-of-arrival (AoA) of the first directional electromagnetic signal based on the estimated combined channel and a previous beamforming codebook including two or more beamforming vectors corresponding to different AoAs; construct an updated beamforming codebook based on the estimated dominant AoA and one or more remaining AoAs spaced apart from the estimated dominant AoA; receive, at the antenna array during a current period, a second directional electromagnetic signal including data symbols; determine a beamforming vector for data reception of the second directional electromagnetic signal based on the updated beamforming code-
(Continued)

book; and detect the data symbols in the second directional electromagnetic signal based on the determined beamforming vector.

22 Claims, 8 Drawing Sheets

Related U.S. Application Data

(60) Provisional application No. 63/005,850, filed on Apr. 6, 2020.

(56) References Cited

U.S. PATENT DOCUMENTS

| | | | |
|---|---|---|---|
| 8,462,714 B2 | 6/2013 | Taoka et al. | |
| 8,660,598 B2 * | 2/2014 | Prasad | H04B 7/0408 455/67.11 |
| 9,537,587 B2 | 1/2017 | Chai et al. | |
| 10,069,547 B2 | 9/2018 | Wang et al. | |
| 10,516,448 B2 | 12/2019 | Kim et al. | |
| 10,594,383 B1 | 3/2020 | Orhan et al. | |
| 10,680,684 B1 | 6/2020 | Cheng et al. | |
| 11,616,563 B2 * | 3/2023 | Tang | H04B 7/086 375/267 |
| 2002/0082016 A1 | 6/2002 | Obayashi | |
| 2005/0013349 A1 * | 1/2005 | Chae | H04B 7/086 375/148 |
| 2006/0244660 A1 | 11/2006 | Ann et al. | |
| 2007/0135167 A1 | 6/2007 | Liu | |
| 2008/0310372 A1 | 12/2008 | Li et al. | |
| 2009/0033555 A1 | 2/2009 | Niu | |
| 2012/0119953 A1 | 5/2012 | Hosoya et al. | |
| 2012/0190396 A1 * | 7/2012 | Oyama | H04W 16/28 455/517 |
| 2013/0223245 A1 | 8/2013 | Taoka et al. | |
| 2015/0365142 A1 | 12/2015 | Chai et al. | |
| 2016/0020876 A1 | 1/2016 | Raghavan et al. | |
| 2016/0308599 A1 | 10/2016 | Hujanen et al. | |
| 2017/0230091 A1 | 8/2017 | Song et al. | |
| 2017/0279503 A1 | 9/2017 | Tomeba et al. | |
| 2018/0146419 A1 * | 5/2018 | Raghavan | H04W 48/16 |
| 2018/0348328 A1 | 12/2018 | Athley et al. | |
| 2018/0359646 A1 * | 12/2018 | Tomeba | H04B 7/04 |
| 2019/0068259 A1 | 2/2019 | Liu et al. | |
| 2019/0116605 A1 | 4/2019 | Luo et al. | |
| 2019/0190569 A1 | 6/2019 | Nayeb Nazar et al. | |
| 2019/0199410 A1 | 6/2019 | Zhao et al. | |
| 2020/0007203 A1 | 1/2020 | Zhou et al. | |
| 2020/0186230 A1 | 6/2020 | Solichien | |
| 2021/0135716 A1 * | 5/2021 | Kuo | H04B 7/0617 |
| 2021/0135723 A1 | 5/2021 | Chiu et al. | |
| 2021/0328653 A1 * | 10/2021 | Tang | H04B 7/088 |

FOREIGN PATENT DOCUMENTS

| | | |
|---|---|---|
| WO | WO 2014/072796 A1 | 5/2014 |
| WO | WO 2019/154992 A1 | 8/2019 |

OTHER PUBLICATIONS

Tang, Yanru et al., "Low Complexity Channel Estimation for Hybrid Beamforming Systems," 5 pages.

Zhan, Qi et al., "Learning based Dynamic Codebook Selection for Analog Beamforming," 5 pages.

U.S. Notice of Allowance dated Mar. 21, 2022, issued in U.S. Appl. No. 16/983,813 (10 pages).

U.S. Notice of Allowance dated Feb. 15, 2023, issued in U.S. Appl. No. 16/983,813 (9 pages).

* cited by examiner

SYSTEMS AND METHODS FOR UPDATING BEAMFORMING CODEBOOKS FOR ANGLE-OF-ARRIVAL ESTIMATION USING COMPRESSIVE SENSING IN WIRELESS COMMUNICATIONS

CROSS-REFERENCE TO RELATED APPLICATION(S)

This application is a continuation of U.S. patent application Ser. No. 16/983,813, filed Aug. 3, 2020, which claims priority to and the benefit of U.S. Provisional Patent Application No. 63/005,850, filed in the United States Patent and Trademark Office on Apr. 6, 2020, the entire contents of both of which are incorporated herein by reference.

FIELD

Aspects of embodiments of the present disclosure relate to systems and methods for updating beamforming codebooks for angle-of-arrival estimation using compressive sensing in wireless communications.

BACKGROUND

In beamforming wireless communication systems, transmitters may control or steer the emission direction of electromagnetic waves and may shape or form these electromagnetic waves into relatively narrow beams. These beams may be formed using arrays of antennas, where different antennas of the array are supplied with time-shifted or phase-shifted versions of a signal, and combinations of constructive interference and destructive interference cause the signal to be concentrated in particular directions. Beamforming enables spatial diversity in the electromagnetic waves (e.g., in contrast to substantially omnidirectional transmission), and also allows the beam to be steered as the relative direction to the receiver changes over time. For example, beamforming allows more communication channels to be operated concurrently—for example, receivers located in different directions with respect to the transmitter can receive different signals from the same transceiver at the same carrier frequency or overlapping frequency bands. Beamforming may be particularly applicable in millimeter wave (mmWave) communications and in massive multiple input multiple output (MIMO) systems.

In hybrid beamforming systems, beam sweeping may be performed periodically to combat the poor link budget by determining the best transmission direction or vector between the transmitter and the receiver, where the best transmission vector is selected from a beamforming codebook or beam codebook. A beamforming codebook includes weights for decoding received directional electromagnetic signals (e.g., wireless signals or radio signals), where different weights correspond to different possible beamforming vectors (e.g., electromagnetic signals received from different directions).

A hybrid beamforming system decodes a directional electromagnetic signal received at the antenna array by combining the received signal with the weights of the beamforming codebook and selecting a dominant direction (e.g., a combination of weights and the signal that has the highest power or signal-to-noise ratio). The performance of beamforming wireless transmission systems depends on the quality of the beamforming codebook, such as how closely the directions of the codebook (at least one of the direction) align with the actual direction at which the electromagnetic signal arrives at the receiver antenna array.

SUMMARY

Aspects of embodiments of the present disclosure relate to systems and methods for updating a beamforming codebook in accordance with changes in transmission conditions using compressive sensing techniques and based on the history of angle-of-arrival directions with respect to a given transmitter.

According to one embodiment of the present disclosure, a method of updating a beamforming codebook includes: receiving, at an antenna array of a wireless communication device during a previous period, a first directional electromagnetic signal including beam sweeping reference symbols of a previous beam sweeping period; computing, by a processing circuit of the wireless communication device, an estimated combined channel based on the received first directional electromagnetic signal; estimating, by the processing circuit, a dominant angle-of-arrival (AoA) of the first directional electromagnetic signal based on the estimated combined channel and a previous beamforming codebook including two or more beamforming vectors corresponding to different angles-of-arrival; and computing, by the processing circuit, one or more remaining angles-of-arrival spaced apart from the estimated dominant angle-of-arrival; constructing, by the processing circuit, an updated beamforming codebook based on the estimated dominant angle-of-arrival and the one or more remaining angles-of-arrival; receiving, at the antenna array during a current period, a second directional electromagnetic signal including data symbols; determining a beamforming vector for data reception of the second directional electromagnetic signal based on the updated beamforming codebook; and detecting, by the processing circuit, the data symbols in the second directional electromagnetic signal based on the determined beamforming vector.

The updated beamforming codebook may consist of two beamforming vectors, wherein the estimating the dominant AoA $\tilde{x}_1$ of the first directional electromagnetic signal includes computing:

$$\tilde{x}_1 = \angle(\hat{\underline{h}}_2 \hat{\underline{h}}_1^H)$$

where $$W_1^H Y = \begin{bmatrix} \hat{\underline{h}}_1 \\ \hat{\underline{h}}_2 \end{bmatrix}$$

and $$W_1 = W(1:2, 1:2) \in \mathcal{C}^{2 \times 2}$$

where Y is the estimated combined channel, and $\hat{\underline{h}}_1$ and $\hat{\underline{h}}_2$ are estimated analog channels corresponding to two antenna elements of the antenna array, wherein the one or more remaining angles-of-arrival consists of one beamforming vector, wherein the antenna array has an even number of antenna elements, and wherein the remaining angle-of-arrival $\tilde{x}_2$ is computed in accordance with $\tilde{x}_2 = \tilde{x}_1 + \pi$, and wherein the updated beamforming codebook $W_t$ is computed in accordance with $$W_t = \begin{bmatrix} a(\tilde{x}_1)^H \\ a(\tilde{x}_1 + \pi)^H \end{bmatrix}.$$

The updated beamforming codebook may include three or more beamforming vectors.

The estimating the dominant AoA $\tilde{x}_1$ of the first directional electromagnetic signal may include computing:

$$\tilde{x}_1 = \underset{x \in \mathcal{N}(b^*)}{\operatorname{argmax}} \frac{\varphi(x)^H Y Y^H \varphi(x)}{\|\varphi(x)\|^2},$$

$$\varphi(\bar{x}_i) = Wa(\bar{x}_i) \in \mathcal{C}^M,$$

$$a(\bar{x}_i) = [e^{j0\bar{x}_i}, \ldots, e^{j(N_R-1)\bar{x}_i}]^T \in \mathcal{C}^{N_R}$$

where Y is the estimated combined channel, and $\mathcal{N}(b^*)$ is a set of angles in a neighborhood around a selected search angle $b^*$.

The selected search angle $b^*$ may be selected in accordance with:

$$b^* = \underset{m}{\operatorname{argmax}} \underline{y}_m \underline{y}_m^H,$$

where $$Y = \begin{bmatrix} \underline{y}_1 \\ \vdots \\ \underline{y}_M \end{bmatrix}.$$

The selected search angle $b^*$ may be selected in accordance with an estimated dominant angle-of-arrival of a third directional electromagnetic signal received in a previous beam sweeping period.

The set of angles in the neighborhood $\mathcal{N}(b^*)$ around the selected search angle $b^*$ may be computed by:

$$\mathcal{N}(b^*) = \{x: x = b^* + \Delta l, l = N, \ldots, 0, \ldots N\}$$

where N controls a number of angles in $\mathcal{N}(b^*)$ to $2N+1$ and where $\Delta$ is an angular resolution of the angles in $\mathcal{N}(b^*)$.

A number of antenna elements $N_R$ in the antenna array may be an integer multiple of a number of beamforming vectors M in the updated beamforming codebook, and the one or more remaining angles-of-arrival $\tilde{x}_i$ may be computed in accordance with:

$$\tilde{x}_i = \tilde{x}_1 + \frac{2\pi}{M}(i-1), i = 2, \ldots, M$$

where $\tilde{x}_1$ is the estimated dominant angle-of-arrival of the first directional electromagnetic signal.

A number of antenna elements $N_R$ in the antenna array may be not an integer multiple of a number of beamforming vectors M in the updated beamforming codebook, and wherein the one or more remaining angles-of-arrival are selected from a constraint set of angles $I(\tilde{x}_1)$, where $$I(\tilde{x}_1) = \left\{ x: x = \tilde{x}_1 + \frac{2\pi}{N_R} n, n = 0, \ldots, N_R - 1 \right\}.$$

The determining the beamforming vector for data reception of the second directional electromagnetic signal may include selecting the beamforming vector for data reception from the updated beamforming codebook without performing channel estimation.

The determining the beamforming vector for data reception of the second directional electromagnetic signal may include explicitly calculating the beamforming vector based on a channel estimation on the second directional electromagnetic signal and based on the updated beamforming codebook.

According to one embodiment of the present disclosure, a wireless communication device is configured to update a beamforming codebook, the wireless communication device including: an antenna array; a processing circuit configured to receive signals from the antenna array and configured to: receive, at the antenna array during a previous period, a first directional electromagnetic signal including beam sweeping reference symbols of a previous beam sweeping period; compute an estimated combined channel based on the received first directional electromagnetic signal; estimate a dominant angle-of-arrival (AoA) of the first directional electromagnetic signal based on the estimated combined channel and a previous beamforming codebook including two or more beamforming vectors corresponding to different angles-of-arrival; compute one or more remaining angles-of-arrival spaced apart from the estimated dominant angle-of-arrival; construct an updated beamforming codebook based on the estimated dominant angle-of-arrival and the one or more remaining angles-of-arrival; receive, at the antenna array during a current period, a second directional electromagnetic signal including data symbols; determine a beamforming vector for data reception of the second directional electromagnetic signal based on the updated beamforming codebook; and detect, by the processing circuit, the data symbols in the second directional electromagnetic signal based on the determined beamforming vector.

The updated beamforming codebook may consist of two beamforming vectors, wherein the processing circuit is configured to estimate the dominant AoA $\tilde{x}_1$ of the first directional electromagnetic signal by computing:

$$\tilde{x}_1 = \angle(\hat{h}_2 \hat{h}_1^H)$$

where $$W_1^H Y = \begin{bmatrix} \hat{h}_1 \\ \hat{h}_2 \end{bmatrix}$$

and $$W_1 = W(1:2, 1:2) \in \mathcal{C}^{2 \times 2}$$

where Y is the estimated combined channel, and $\hat{h}_1$ and $\hat{h}_2$ are estimated analog channels corresponding to two antenna elements of the antenna array, wherein the one or more remaining angles-of-arrival consists of one beamforming vector, wherein the antenna array has an even number of antenna elements, and wherein the remaining angle-of-arrival $\tilde{x}_2$ is computed in accordance with $\tilde{x}_2 = \tilde{x}_1 + \pi$, and wherein the updated beamforming codebook $W_t$ is computed in accordance with $$W_t = \begin{bmatrix} a(\tilde{x}_1)^H \\ a(\tilde{x}_1 + \pi)^H \end{bmatrix}.$$

The updated beamforming codebook may include three or more beamforming vectors.

The processing circuit may be configured to estimate the dominant AoA $\tilde{x}_1$ of the first directional electromagnetic signal by computing:

$$\tilde{x}_1 = \underset{x \in \mathcal{N}(b^*)}{\operatorname{argmax}} \frac{\varphi(x)^H Y Y^H \varphi(x)}{\|\varphi(x)\|^2},$$

$$\varphi(\bar{x}_i) = Wa(\bar{x}_i) \in \mathcal{C}^M,$$

$$a(\bar{x}_i) = [e^{j0\bar{x}_i}, \ldots, e^{j(N_R-1)\bar{x}_i}]^T \in \mathcal{C}^{N_R}$$

where Y is the estimated combined channel, and $\mathcal{N}(b^*)$ is a set of angles in a neighborhood around a selected search angle $b^*$.

The processing circuit may be configured to select the selected search angle $b^*$ in accordance with:

$$b^* = \underset{m}{\operatorname{argmax}} \underline{y}_m \underline{y}_m^H,$$

where $$Y = \begin{bmatrix} \underline{y}_1 \\ \vdots \\ \underline{y}_M \end{bmatrix}.$$

The processing circuit may be configured to select the selected search angle $b^*$ in accordance with an estimated dominant angle-of-arrival of a third directional electromagnetic signal received in a previous beam sweeping period.

The processing circuit may be configured to compute the set of angles in the neighborhood $\mathcal{N}(b^*)$ around the selected search angle $b^*$ by:

$$\mathcal{N}(b^*) = \{x: x = b^* + \Delta l, l = -N, \ldots, 0, \ldots N\}$$

where N controls a number of angles in $\mathcal{N}(b^*)$ to 2N+1 and where $\Delta$ is an angular resolution of the angles in $\mathcal{N}(b^*)$.

A number of antenna elements $N_R$ in the antenna array may be an integer multiple of a number of beamforming vectors M in the updated beamforming codebook, and wherein the one or more remaining angles-of-arrival $\tilde{x}_i$ may be computed in accordance with:

$$\tilde{x}_i = \tilde{x}_1 + \frac{2\pi}{M}(i-1), i = 2, \ldots, M$$

where $\tilde{x}_1$ is the estimated dominant angle-of-arrival of the first directional electromagnetic signal.

A number of antenna elements $N_R$ in the antenna array may be not an integer multiple of a number of beamforming vectors M in the updated beamforming codebook, and wherein the one or more remaining angles-of-arrival are selected from a constraint set of angles $I(\tilde{x}_1)$, where $$I(\tilde{x}_1) = \left\{x: x = \tilde{x}_1 + \frac{2\pi}{N_R}n, n = 0, \ldots, N_R - 1\right\}.$$

The processing circuit may be configured to determine the beamforming vector for data reception of the second directional electromagnetic signal by selecting the beamforming vector for data reception from the updated beamforming codebook without performing channel estimation.

The determining the beamforming vector for data reception of the second directional electromagnetic signal may include explicitly calculating the beamforming vector based on a channel estimation on the second directional electromagnetic signal and based on the updated beamforming codebook.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

In hybrid beamforming wireless communication systems, a mobile station (MS) (also referred to as user equipment (UE)) or a base station (BS) periodically performs beam sweeping to combat poor link budgets in order to improve performance (e.g., signal-to-noise ratio). Aspects of embodiments of the present disclosure will be described in the context of beam sweeping at UE, which will be considered a receiver (Rx). However, embodiments of the present disclosure are not limited thereto, and may also be applied at the base station. When performing beam sweeping measurements, UE chooses different beamforming vectors from a beamforming codebook W, where the beamforming vectors are used to combine signals from different antennas (e.g., different antenna elements of an antenna array) attached to the UE. Based on the beam sweeping measurements, the UE determines a beamforming vector for data reception. Approaches for determining a beamforming vector include: selecting a beamforming vector for data reception from a pre-defined beamforming codebook without performing channel estimation; and calculating a beamforming vector for data reception explicitly based on channel estimation. In both of these approaches, the quality of the beamforming codebook W is an important factor in the quality of the determined beamforming vector. Accordingly, aspects of embodiments of the present disclosure relate to systems and methods for updating the beamforming codebook W based on beam sweeping measurements to improve system performance.

Figure 1:
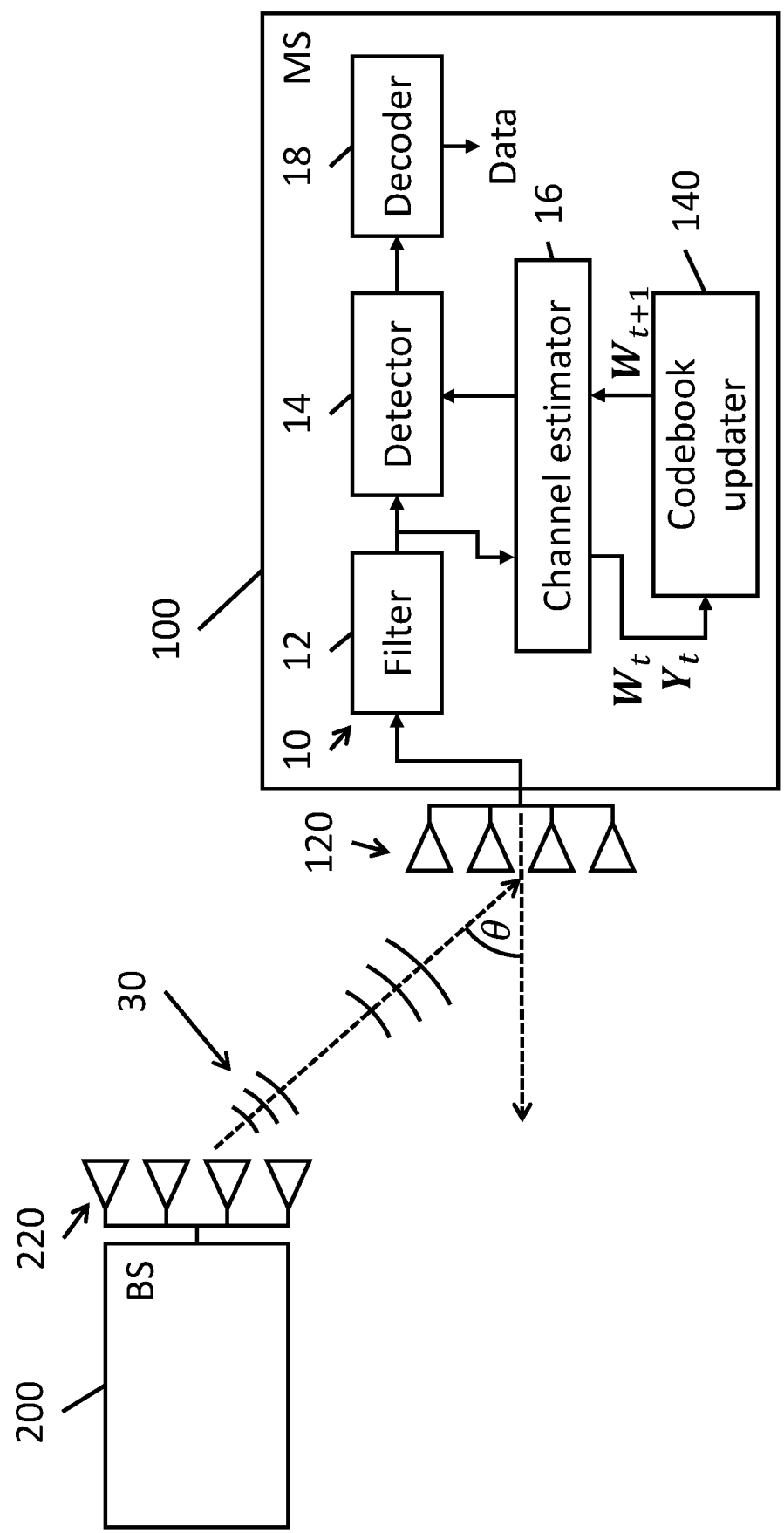
FIG. 1 is a block diagram of a beamforming wireless communication system according to one embodiment of the present disclosure.

FIG. 1 is a block diagram of a beamforming wireless communication system according to one embodiment of the present disclosure. In the embodiment shown in FIG. 1, a mobile station (MS) or user equipment (UE) 100 is in communication with a base station (BS) 200, where the base station 200 is transmitting a directional signal 30 (e.g., directional electromagnetic signal) to the mobile station 100. The mobile station 100 includes an antenna array 120 that includes multiple antenna elements. Likewise, the base station 200 includes an antenna array 220 that also includes multiple elements. In the embodiment shown in FIG. 1, the antenna array 120 of the mobile station 100 and the antenna array 220 of the base station 200 are linear arrays, but embodiments of the present disclosure are not limited thereto and may also be applied to antenna arrays of different shapes, such as planar arrays. The base station 200 can steer the direction at which the antenna array 220 emits the directional signal 30 by controlling a phase shift or time delay between supplying the signal to the different elements of the antenna array. Likewise, the mobile station 100 can steer the direction at which its antenna array 120 receives signals.

In the arrangement shown in FIG. 1, the directional signal 30 arrives at the mobile station 100 at an angle θ with respect to the antenna array 120. For the sake of discussion, a direction perpendicular to the antenna array will be assumed to be at an angle of zero (0), and the antenna array 120 is capable of receiving signals over 360° (or $2\pi$ radians) therefore the angle α may range from, for example, $-180°$ to $+180°$ or, in radians, $(-\pi, \pi)$. Equivalently, the angle-of-arrival θ may be expressed as being in the range of 0° to 360° or 0 radians to $2\pi$ radians.

As shown in FIG. 1, a mobile station 100 includes a radio transceiver 10 that includes various components for recovering data encoded in the received directional signal 30. (The radio transceiver 10 may also include components for transmitting radio signals. While the discussion herein focuses on the receive side of the radio transceiver 10, embodiments of the present disclosure are not limited to radio receivers. For example, aspects of embodiments of the present disclosure may be applied to update a beamforming codebook when performing beam sweeping at a base station configured to transmit data.) The received directional signal 30 may be supplied to a receive filter 12 (e.g., a band pass filter), and the filtered signal may be supplied to a detector 14 and a channel estimator 16. The channel estimator 16 may generate channel state information (CSI) that is used to control the detector 14, as well as to other components of the radio transceiver 10, to adapt to changing conditions in the environment. These changing conditions in the environment may include an angle-of-arrival (AoA) θ of the received directional signal 30 at the antenna array 120 of the mobile station 100. Some of the parameters provided from the channel estimator 16 to the detector 14 include parameters based on the current estimated angle-of-arrival (AoA) of the received directional signal 30. The channel estimator 16 may supply these parameters based on a beamforming codebook W. According to some embodiments of the present disclosure, the channel estimator 16 communicates with or includes a beamforming codebook updater 140 configured to update the beamforming codebook W between beam sweeping periods, as discussed in more detail below.

The output of the channel estimator 16 is supplied to a detector 14 which uses the channel state information to perform symbol detection. The decoder 18 may be configured to receive the detected symbols from the detector 14 and to decode the detected symbols into data, such as a digital bitstream, to be supplied for consumption by applications in the radio transceiver 10, such as voice calls, data packets, and the like. In various embodiments of the present disclosure, the components of the radio transceiver 10, such as the filter 12, the detector 14, the channel estimator 16, the codebook updater 140, and the decoder 18 may be implemented in one or more processing circuits (e.g., a radio baseband processor (BP or BPP), a central processing unit (CPU), a microcontroller, a digital signal processor (DSP), a field programmable gate array (FPGA), or an application specific integrated circuit (ASIC)) of a digital radio, where various portions of various blocks may be implemented in the same circuit (e.g., on the same die or in a same package) or in different circuits (e.g., on different dies or in different packages, connected over a communication bus).

As noted above, in a hybrid beamforming system, a radio receiver or a radio transceiver may include an antenna array (e.g., antenna array 120) that is steerable to receive a directional signal from any direction over a range of possible steering angles. In some circumstances, the antenna array is electronically steered using, for example, phase shifts or time delays between antenna elements (or receive antennas) of the antenna array. The particular parameters corresponding to a given direction may be represented as a beamforming vector $\underline{w}$. A beamforming codebook W may be include two or more different beamforming vectors $\underline{w}$. For example, a codebook W having M different beamforming vectors may be denoted as:

$$W = \begin{bmatrix} \underline{w}_1 \\ \vdots \\ \underline{w}_M \end{bmatrix} \in \mathcal{C}^{M \times N_R} \quad (1)$$

where $N_R$ denotes the number of antenna elements (or receive antennas) per radio frequency (RF) chain, and assuming that $N_R > M$.

Figure 2A:
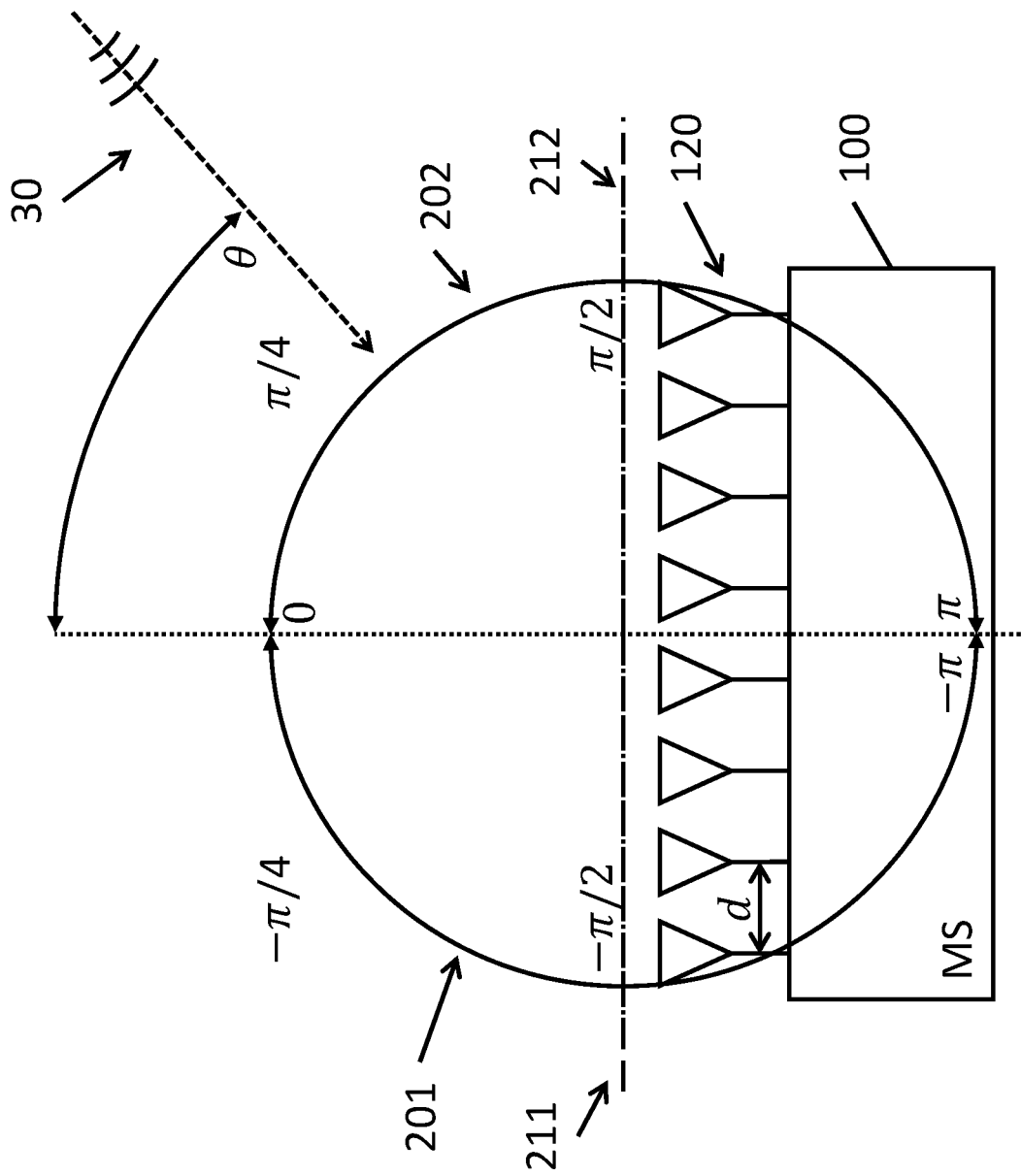
FIGS. 2A, 2B, and 2C are schematic depictions of the determination of an angle of arrival of an electromagnetic signal.
Figure 2B:
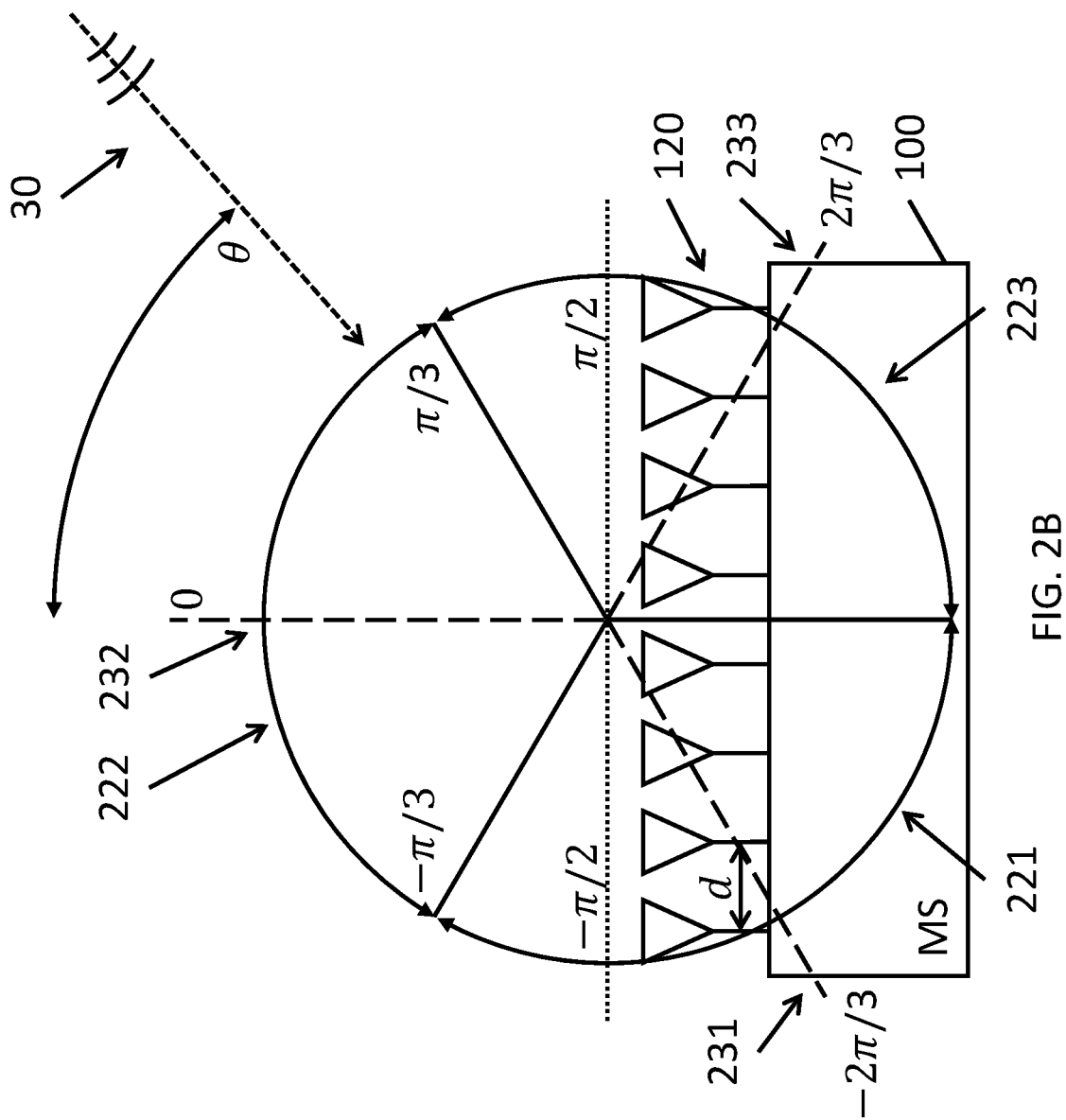
Figure 2C:
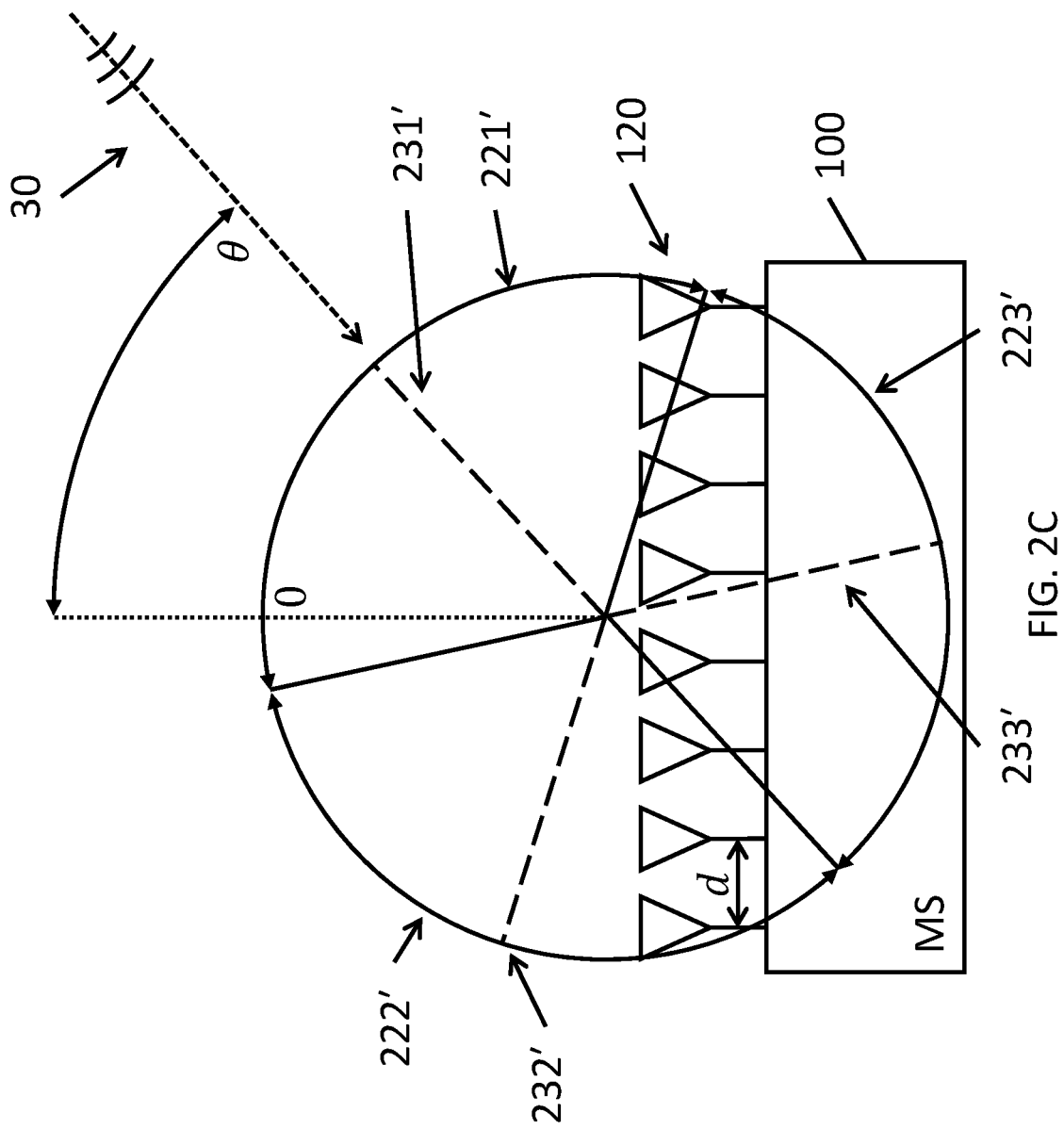

FIGS. 2A, 2B, and 2C are schematic depictions of the determination of an angle of arrival of a signal. In the embodiments shown in FIGS. 2A, 2B, and 2C, the antenna elements of the antenna array 120 are arranged as a linear array and the antenna elements are uniformly spaced at a distance d. As shown in FIG. 2A, the directional signal 30 arrives at an angle θ measured with respect to a direction perpendicular to the antenna array 120. As noted above, the antenna array 120 is assumed to be capable of receiving signals received at angles from to $-\pi$ to $\pi$. FIG. 2A illustrates an arrangement where the codebook W has two beamforming vectors $\underline{w}$ (M=2). The range $-\pi$ to $\pi$ is divided into a first sector 201 corresponding to angles-of-arrival in the range $(-\pi, 0)$ and a second sector 202 corresponding to angles-of-arrival in the range $(0, \pi)$. The first sector 201 corresponds to a first beamforming vector 211 along angle $-\pi/2$, and the second sector 202 corresponds to a second beamforming vector 212 along angle $\pi/2$.

An actual channel H at K different subcarriers may be denoted as:

$$H = [h_1, \ldots, h_K] \in \mathcal{C}^{N_R \times K} \quad (2)$$

A combined signal Z can be modeled as:

$$Z = W(HP + V) \quad (3)$$

where $P = \text{diag}(p_1, \ldots, p_K)$ denotes beam sweeping reference symbols in the transmitted directional signal 30 during a current (t-th) beam sweeping period, and $V \in \mathcal{C}^{N_R \times K}$ denotes channel noise.

Based on this model of the combined signal Z, the channel estimator 16 estimates a combined channel $H_c = WH$ for a t-th beam sweeping period, where $Y_t \in \mathcal{C}^{M \times K}$ is denoted as an estimate of $H_c$ during the t-th beam sweeping period, and where $Y_t$ is modeled as:

$$Y_t = H_c + N_t, \text{ where } H_c = W_t H_t, \quad (4)$$

where $W_t \in \mathcal{C}^{M \times N_R}$ is the current beamforming codebook for the t-th beam sweeping period, $H_t \in \mathcal{C}^{N_R \times K}$ is the unknown channel, and $N_t$ represents estimation error of the combined channel during the t-th beam sweeping period and is denoted as:

$$N_t = \begin{bmatrix} n_1 \\ \vdots \\ n_M \end{bmatrix} \in \mathcal{C}^{M \times K} \quad (5)$$

After performing beam sweeping, the best beamforming vector can be selected among the swept beamforming vectors $\underline{w}$ to improve analog beamforming gain (e.g., improve the ability of the detector 14 to detect symbols in the received directional signal 30). In the example shown in FIG. 2A, the channel estimator may select between the first beamforming vector 211 and the second beamforming vector 212. Because the angle-of-arrival θ of the directional signal 30 is in the second sector 202 and the second beamforming vector 212 is closer to the actual angle-of-arrival θ of the directional signal 30, the channel estimator may select the second beamforming vector 212 as the best beamforming vector. Alternatively, given the measurements obtained from the beam sweeping process, an analog channel can be estimated such that the beamforming vector $\underline{w}$ for data reception (e.g., during a data reception period or data transmission period between beam sweeping periods) can be derived to further improve system performance. In both cases, the choice of beamforming codebook W is a major factor in the performance of the radio receiver system.

FIG. 2B provides another example in which the codebook W includes three beamforming vectors (M=3). In more detail, a first sector 221 may correspond to angles-of-arrival from $-\pi$ to $-\pi/3$ and correspond to a first beamforming vector 231 at angle $-2\pi/3$, a second sector 222 may correspond to angles-of-arrival from $-\pi/3$ to $+\pi/3$ and correspond to a second beamforming vector 232 at angle 0 (or boresight), and a third sector 223 may correspond to angles-of-arrival from $+\pi/3$ to $+\pi$ and correspond to a third beamforming vector 233 at angle $+2\pi/3$.

In the arrangement shown in FIG. 2B, the channel estimator 16 may determine that the second beamforming vector 232 is the best beamforming vector and supply the parameters of the third beamforming vector 233 to the detector 14 for use in decoding the received directional signal 30. However, as seen in FIG. 2B, the second beamforming vector 232 is not perfectly aligned with the angle-of-arrival θ of the received directional signal 30, and performance of the radio transceiver 10 in decoding the signal would be improved if the selected beamforming vector more closely matched the angle-of-arrival θ of the received signal 30.

Accordingly, aspects of embodiments of the present disclosure relate to improving hybrid beamforming gain by computing an updated beamforming codebook $W_{t+1}$ for a next (t+1) beam sweeping period based on of the combined channel $Y_t \in \mathcal{C}^{M \times K}$ and based on the beamforming codebook $W_t \in \mathcal{C}^{M \times N_R}$ for the current (t) beam sweeping period. (This may equivalently be expressed as updating a previous beamforming codebook $W_{t-1}$ during a previous beam sweeping period t–1 to compute an updated beamforming codebook (or current beamforming codebook) $W_t$ for the current period t.)

FIG. 2C illustrates a situation in which the beamforming codebook is updated. As shown in FIG. 2C, after updating the beamforming codebook, the directions of the updated beamforming vectors 231', 232', and 233' are different from the directions of the beamforming vectors 231, 232, and 233 shown in FIG. 2B. In more detail, the direction of the updated first beamforming vector 231' is aligned with the angle-of-arrival θ of the directional signal 30 and the endpoints of the corresponding third sector 221' are likewise updated. The updated second and third beamforming vectors 232' and 233' are also updated to point in new directions. Systems and methods for computing an updated beamforming codebook in accordance with embodiments of the present disclosure are described in more detail below.

Figure 3:
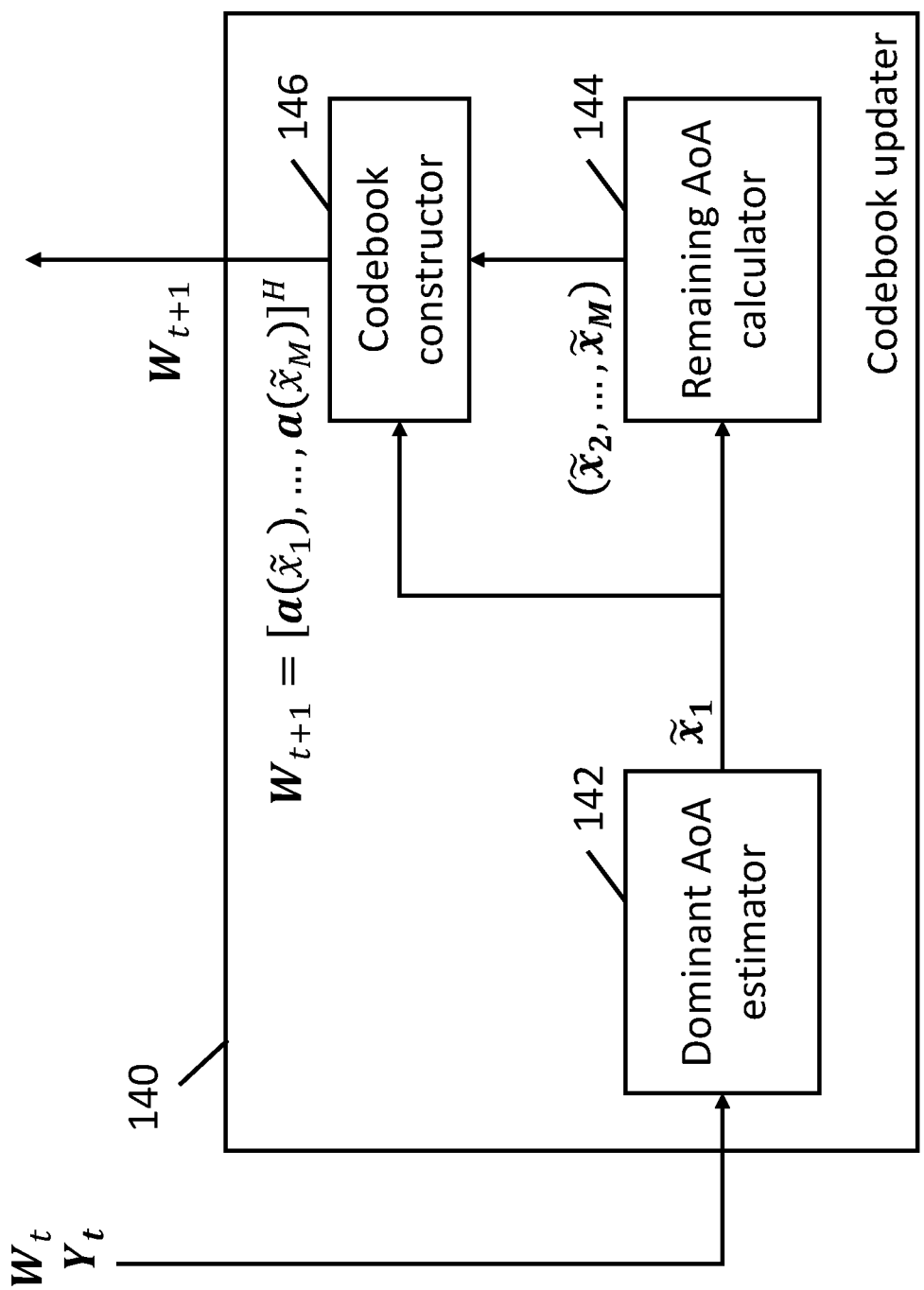
FIG. 3 is a block diagram of a beamforming codebook updater according to one embodiment of the present disclosure.
Figure 4:
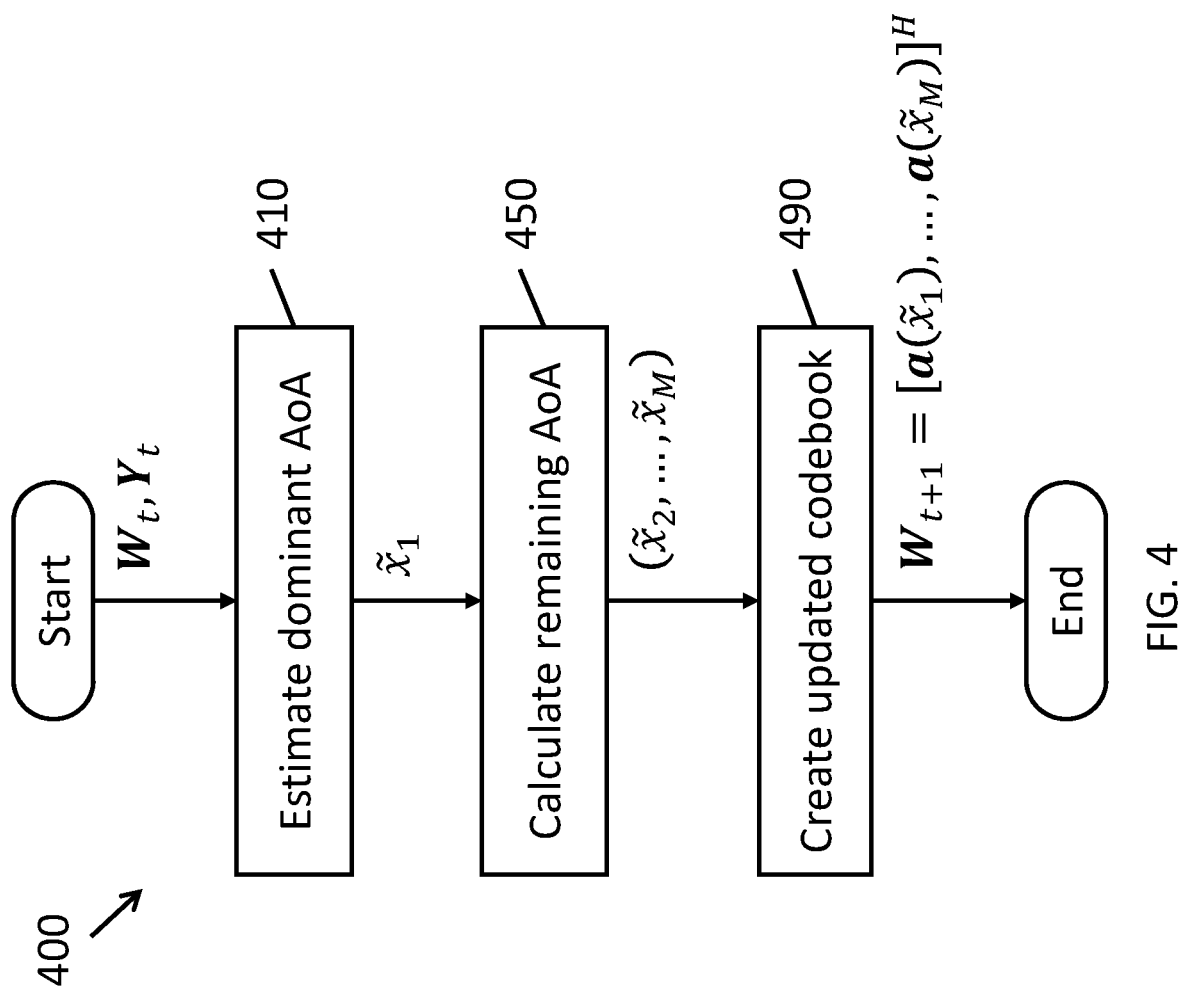
FIG. 4 is a flowchart depicting a method 400 for updating a beamforming codebook for a next beam sweep in accordance with one embodiment of the present disclosure.

FIG. 3 is a block diagram of a beamforming codebook updater 140 according to one embodiment of the present disclosure. As shown in FIG. 3, in one embodiment, the codebook updater 140 includes a dominant angle-of-arrival (AoA) estimator 142, a remaining angle-of-arrival (AoA) calculator 144, and a codebook constructor 146. FIG. 4 is a flowchart depicting a method 400 for updating a beamforming codebook in accordance with one embodiment of the present disclosure.

Referring to FIGS. 3 and 4, according to one embodiment of the present disclosure, the channel estimator 16 supplies an estimated combined channel $Y_t$ to the codebook updater 140. The codebook updater 140 may also receive, as input, the beamforming codebook $W_t$ for the current beam sweeping period t, or the codebook updater 140 may have the beamforming codebook $W_t$ already stored in memory (e.g., from previously calculations or based on initialization of the codebook updater 140).

Aspects of embodiments of the present disclosure relate to a compressive sensing (CS or compressed sensing) based approach for codebook update, under the assumption that the channel is sparse in the angular domain. As noted above, given θ as the angle of arrival (AoA) of the directional signal 30 and d as the antenna separation or antenna spacing of the antenna elements of a uniform linear array, the antenna response vector can be written as:

$$a(\theta) = \left[ e^{j0\frac{2\pi}{\lambda}d\cos\theta}, \ldots, e^{j(N_R-1)\frac{2\pi}{\lambda}d\cos\theta} \right]^T \in \mathcal{C}^{N_R} \quad (6)$$

where λ denotes wavelength, T indicates a transpose operation, and without loss of generality, assuming that $d = \pi/2$ and $x = \pi \cos\theta$. Denote $\overline{X} = \{\overline{x}_1, \ldots, \overline{x}_N\}$ as a set of quantized values for angles-of-arrival (AoAs) where:

$$\overline{x}_n = \pi\left(-1 + \frac{2}{N}(n-1)\right), n = 1, \ldots, N \quad (7)$$

In some embodiments of the present disclosure, the initial beamforming codebook (e.g., when the system first starts up, before performing any updates to the beamforming codebook) is a uniform discrete Fourier transform (DFT) codebook. In some embodiments, the initial beamforming codebook is a partial identity codebook. In some embodiments, the initial beamforming codebook is the codebook given below:

$$W=[U_M 0] \quad (8)$$

for some unitary matrix $U_M$. When $U_M$ is a full size DFT matrix, the codebook updater 140 can extract M angles from $U_M$ for estimating the dominant AoA, as described in more detail below.

In operation 410, the dominant AoA estimator 142 of the codebook updater 140 estimates the dominant AoA $\tilde{x}_1$ based on the given estimated combined channel Y and the current beamforming codebook $W_t$.

After estimating the dominant AoA $\tilde{x}_1$, in operation 450, the remaining AoA calculator 144 of the codebook updater 140 computes the remaining (M−1) AoAs ($\tilde{x}_2, \ldots, \tilde{x}_M$) for the updated codebook, and in operation 490 the codebook constructor 146 of the codebook updater 140 constructs the updated beamforming codebook $W_{t+1}$ based on the computed dominant AoA $\tilde{x}_1$ and the remaining (M−1) AoAs ($\tilde{x}_2, \ldots, \tilde{x}_M$).

The details of computing the dominant AoA $\tilde{x}_1$ by the dominant AoA estimator 142 in operation 410 and the remaining M−1 AoAs ($\tilde{x}_2, \ldots, \tilde{x}_M$) by the remaining AoA calculator 144 in operation 450 will be described in more detail below with respect to two different conditions: a case where the beamforming codebook W includes exactly two beamforming vectors, M=2 (e.g., as illustrated in FIG. 2A); and a case where the beamforming codebook W includes more than two beamforming vectors, M>2 (equivalently, three or more beamforming vectors, M≥3, e.g., the case of M=3, as illustrated in FIGS. 2B and 2C).

In cases where the beamforming codebook W includes exactly two beamforming vectors (M=2) and the number of antenna elements $N_R$ in the receive antenna array 120 is even, if the beamforming codebook W can be written as:

$$W=[W_1 \ldots W_J] \in \mathcal{C}^{2 \times N_R}, \quad (9)$$

$$W_i = C_i W_1 \in \mathcal{C}^{2 \times 2} \text{ for } i=1, \ldots, J=N_R/2 \quad (10)$$

for some constants $C_i$, then the dominant AoA estimator 142 estimates the dominant AoA $\tilde{x}_1$ in operation 410 according to the closed form solution given below.

$$\tilde{x}_1 = \angle(\hat{h}_2 \hat{h}_1^H) \quad (11)$$

$$W_1^H Y = \begin{bmatrix} \hat{h}_1 \\ \hat{h}_2 \end{bmatrix} \quad (12)$$

$$W_1 = W(1:2,1:2) \in \mathcal{C}^{2 \times 2} \quad (13)$$

where $\hat{h}_{1t}$ and $\hat{h}_{2t}$ are the estimated analog channels corresponding to the first two antenna elements (e.g., two antenna elements of the antenna array).

In this embodiment, the only other AoA $\tilde{x}_2$ (because M=2, and therefore M−1=1) is computed by the remaining AoA calculator 144 in operation 450 as pointing in the opposite direction from the dominant AoA in accordance with: $\tilde{x}_2 = \tilde{x}_1 + \pi$.

Accordingly, in operation 490, the codebook constructor 146 constructs the updated beamforming codebook $W_{t+1}$ as $$W_{t+1} = \begin{bmatrix} a(\tilde{x}_1)^H \\ a(\tilde{x}_1 + \pi)^H \end{bmatrix} \quad (14)$$

The updated beamforming codebook $W_{t+1}$ is a uniform discrete Fourier transform (DFT) codebook. If $N_R$ is even, then $W_{t+1}$ satisfies the conditions of Equations (9) and (10), above. Therefore, in the case where M=2, during each beam sweeping period, the closed form solution in accordance with equations (11), (12), and (13) can be used to derive the dominant AoA $\tilde{x}_1$ and the remaining AoAs (the other AoA $\tilde{x}_2$) of the updated beamforming codebook.

Figure 5:
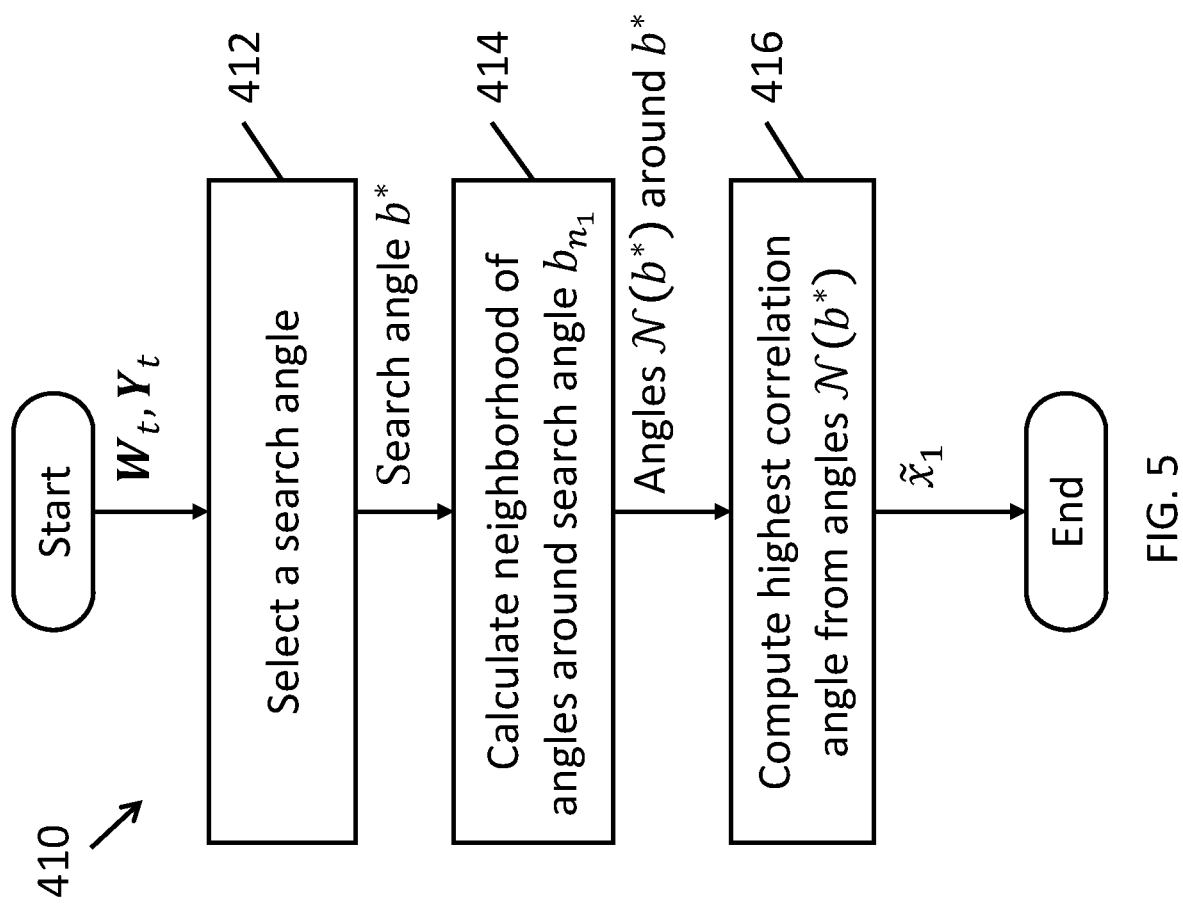
FIG. 5 is a flowchart of a method for computing a dominant angle-of-arrival (AoA) according to one embodiment of the present disclosure.

In cases where the beamforming codebook includes more than two beamforming vectors (M>2), aspects of embodiments of the present disclosure relate to reducing the complexity of searching for the dominant AoA in operation 410 by the dominant AoA estimator 142 by only searching among a particular set of angles. FIG. 5 is a flowchart of a method for computing a dominant angle-of-arrival (AoA) according to one embodiment of the present disclosure.

Assuming that each beamforming vector $\underline{w}$ in the beamforming codebook W is a discrete Fourier transform (DFT) vector, corresponding to angles $b_1, \ldots, b_M$, then the beamforming codebook W can be expressed as:

$$W = \begin{bmatrix} a(b_1)^H \\ \vdots \\ a(b_M)^H \end{bmatrix} \quad (15)$$

In other words, the dominant AoA estimator chooses a dominant AoA b* from among the angles $b_1, \ldots, b_M$ of current beamforming codebook $W_t$ by selecting the angle that has the largest received signal power, e.g., that maximizes the expression:

$$b^* = \text{argmax}_m \underline{y}_m^H \underline{y}_m, Y = \begin{bmatrix} \underline{y}_1 \\ \vdots \\ \underline{y}_M \end{bmatrix} \quad (16)$$

Expressed as formula, the dominant AoA $\tilde{x}_1$ of the channel is estimated according to:

$$\tilde{x}_1 = \underset{x \in \mathcal{N}(b^*)}{\text{argmax}} \frac{\varphi(x)^H Y Y^H \varphi(x)}{\|\varphi(x)\|^2} \quad (17)$$

where $\varphi(x)$ is a basis, where H indicates a conjugate transpose, and where $\mathcal{N}(b^*)$ is a set of angles in a neighborhood around a selected search angle b*.

In some embodiments of the present disclosure, $\mathcal{N}(b^*)$ refers to N quantized values that are uniformly sampled between $-\pi$ to $\pi$ (e.g., the full range of possible values). This approach may be beneficial when there is no prior knowledge about the likely angle-of-arrival of the received directional signal 30.

In some embodiments, instead of searching among N quantized values uniformly sampled between $-\pi$ to $\pi$, aspects of embodiments of the present disclosure relate to the dominant AoA estimator 142 computing the dominant AoA $\tilde{x}_1$ from a neighborhood of potential angles sampled around a search angle b*, chosen from $b_1, \ldots, b_M$, that results in the largest received signal power. According to some embodiments, in operation 412, the dominant AoA estimator 142 selects a search angle b* from $b_1, \ldots, b_M$. In some embodiments, n, is calculated in accordance with:

$$b^* = \operatorname*{argmax}_{m} \underline{y}_m \underline{y}_m^H, \quad (18)$$

$$Y = \begin{bmatrix} \underline{y}_1 \\ \vdots \\ \underline{y}_M \end{bmatrix} \quad (19)$$

Given a selected search angle b*, according to some embodiments of the present disclosure, in operation 414, the dominant AoA estimator 142 then computes a set of possible search angles $\mathcal{N}$ (b*) in the neighborhood of the selected search angle b* is given by:

$$\mathcal{N}(b^*) = \{x : x = b_{n_1} + \frac{\pi}{8} l, l = -4, \ldots, 0, \ldots, 4\} \quad (20)$$

In the above expression, nine possible search angles are computed with the angle resolution of $\pi/8$. However, embodiments of the present disclosure are not limited thereto and may include other numbers of sampling points, such as 17 points sampled with an angle resolution of $\pi/16$ or 13 points sampled with an angle resolution of $\pi/12$.

More generally, for dominant AoA estimation with M>2, given the selected angle b*, different choices of possible search angles $\mathcal{N}$ (b*) in a neighborhood can be computed when estimating the dominant AoA $\tilde{x}_1$. More specifically, according to the complexity affordable to the hardware constraints of the codebook updater 140 and the confidence level of selected angle b*, the dominant AoA estimator 142 can dynamically adjust the set of possible search angles $\mathcal{N}$ (b*):

$$\mathcal{N}(b^*) = \{x : x = b^* + \Delta l, k = N, \ldots, 0, \ldots N\} \quad (21)$$

by choosing appropriate values for angular resolution $\Delta$ and number of angles in the set 2N+1. For example, if complexity is not an issue (e.g., the codebook updater has sufficient processing capability to perform a computation within the allocated time window, e.g., before the next (t+1) beam sweeping period), the dominant AoA estimator 142 can use a large value of N and small value of $\Delta$. If the confidence of the selected angle b* is high (e.g., high confidence that the selected angle $b_{n_1}$ is near the actual angle of arrival), given the complexity level, one can choose small value of $\Delta$ to have finer angular resolution (e.g., likely resulting in an estimated dominant AoA that is closer to the actual AoA of the received directional signal 30).

In operation 416, the dominant AoA estimator 142 then identifies the dominant AoA $\tilde{x}_1$ from among the angles in neighborhood $\mathcal{N}$ (b*) of selected search angle b* according to:

$$\tilde{x}_1 = \operatorname*{argmax}_{x \in \mathcal{N}(b^*)} \frac{\varphi(x)^H Y Y^H \varphi(x)}{\|\varphi(x)\|^2} \quad (22)$$

In other words, the dominant AoA estimator 142 computes correlation at a sampling of points $\mathcal{N}$ (b*) (e.g., 9 points in the above expression) around selected search angle b* and selects the angle that has the maximum correlation as the estimated dominant AoA $\tilde{x}_1$. In some embodiments, where each row in the beamforming codebook W is not a DFT vector, the correlation is calculated at a few AoAs and b* is selected based on the highest correlation AoA among those few AoAs.

Furthermore, in some embodiments of the present disclosure, if the dominant AoA $\tilde{x}_1$ of the actual channel changes slowly between two beam sweeping periods (e.g., because the mobile station is relatively still or at rest), in t-th beam sweeping period, the selected search angle b* will be equal to or close to the estimated dominant AoA $\tilde{x}_{1(t-1)}$ from the previous beam sweeping period (t 1). Accordingly, in some embodiments of the present disclosure, for t>1, instead of calculating $b_t^*$, the dominant AoA $\tilde{x}_{1(t-1)}$ from the previous beam sweeping period is used in operation 412 as the selected search angle $b_t^*$) in whose neighborhood the dominant AoA is searched during the current beam sweeping period. However, for the first beam sweeping period (t=1), the dominant AoA estimator 142 may calculate the selected search angle $b_1^*$ because there is no information available on the channel dominant AoA. (Note that the approximation discussed above works for any value of number of beamforming vectors M and number of receive antennas $N_R$.)

In some embodiments of the present disclosure, the estimation of the dominant AoA $\tilde{x}_1$ is further simplified for periods after the initial period (t>1). In particular, denoting:

$$Y_t = \begin{bmatrix} \underline{y}_{1t} \\ \underline{y}_{2t} \\ \underline{y}_{3t} \end{bmatrix}, \tilde{Y}_t = \begin{bmatrix} \underline{y}_{1t} \\ \underline{y}_{2t} \end{bmatrix} \quad (23)$$

and $$W_t = \begin{bmatrix} a(\tilde{x}_{1(t-1)})^H \\ a(\tilde{x}_{1(t-1)} + \pi)^H \\ a(\tilde{x}_{3(t-1)})^H \end{bmatrix}, \quad (24)$$

$$\tilde{W}_t = \begin{bmatrix} a(\tilde{x}_{1(t-1)})^H \\ a(\tilde{x}_{1(t-1)} + \pi)^H \end{bmatrix} = [\tilde{W}_{1t} \ldots \tilde{W}_{Jt}]$$

$$\tilde{W}_{jt} \in \mathcal{C}^{2 \times 2}, j = 1, \ldots, \frac{N_R}{2} \quad (25)$$

then, in some embodiments, the dominant AoA $\tilde{x}_{1t}$ of the current beam sweeping period t is calculated in accordance with $$\tilde{x}_{1t} = \angle(\hat{h}_{2t} \hat{h}_{1t}^H), \text{ where } \tilde{W}_{1t}^H \tilde{Y}_t = \begin{bmatrix} \hat{h}_{1t} \\ \hat{h}_{2t} \end{bmatrix} \quad (26)$$

In other words, in some embodiments of the present disclosure, the dominant AoA estimator 142 considers only the first two beam sweeping measurements $\underline{y}_{1t}$ and $\underline{y}_{2t}$ when estimating $\tilde{x}_{1t}$. (However, when recovering the channel using the detector 14, all beam vectors in the current beamforming codebook $W_t$ are considered.)

Referring back to FIGS. 3 and 4, in operation 450, the remaining AoA calculator 144 calculates the remaining (M-1) AoAs (or beamforming vectors) for the updated codebook W for the case where M>2.

In embodiments where the number of antenna elements $N_R$ in the antenna array 120 is an integer multiple of the number of beamforming vectors M in the beamforming codebook W, the remaining AoA calculator calculates the remaining AoAs in operation 450 in accordance with:

$$\tilde{x}_i = \tilde{x}_1 + \frac{2\pi}{M}(i-1), i = 2, \ldots, M \quad (27)$$

In embodiments where the number of antenna elements $N_R$ in the antenna array 120 is not an integer multiple of the number of beamforming vectors M in the beamforming codebook W, the remaining AoA calculator calculates the remaining AoAs in operation 450 from a constraint set of angles $I(\tilde{x}_1)$ spaced around the 360° or 2π range of possible AoAs, where:

$$l(\tilde{x}_1) = \left\{ x : x = \tilde{x}_1 + \frac{2\pi}{N_R}n, n = 0, \ldots, N_R - 1 \right\} \quad (28)$$

In more detail, in some embodiments, the remaining AoAs are calculated from $I(\tilde{x}_1)$ by an iterative process such as simultaneous orthogonal matching pursuit (SOMP).

In some embodiments, such as where the remaining AoA calculator 144 is computationally constrained (e.g., it may be impractical to use an iterative algorithm within the time and/or energy budget of the system), the remaining AoA calculator 144 chooses the remaining AoAs from $I(\tilde{x}_1)$ in a manner that results in an orthogonal updated codebook W, as described in more detail below.

As one example, in the case where M=3, according to one embodiment, given an estimated dominant AoA $\tilde{x}_1$, the selection of the remaining AoAs is performed by choosing:

$$\tilde{x}_2 = \tilde{x}_1 - 2\pi/N_R \quad (29)$$

$$\tilde{x}_3 = \tilde{x}_1 + 2\pi/N_R \quad (30)$$

In the case where M is not 3, the remaining AoAs may be selected arbitrarily from the set $I(\tilde{x}_1)$ to form an orthogonal beamforming codebook.

According to another embodiment of the present disclosure, in a case that there is an even number of antenna elements $N_R$ in the receive antenna array 120, given an estimated dominant AoA $\tilde{x}_1$, the arbitrary selection of remaining AoAs is performed by choosing:

$$\tilde{x}_2 = \tilde{x} + \pi \quad (31)$$

$$\tilde{x}_3 = \tilde{x}_1 + 2\pi/N_R \quad (32)$$

In the case where M is not 3, the remaining AoAs may be selected arbitrarily from the set $I(\tilde{x}_1)$ to form an orthogonal beamforming codebook.

Given the beamforming vectors or AoAs estimated by the dominant AoA estimator 142 and the remaining AoA calculator 144 as discussed above, the codebook constructor 146 constructs an updated beamforming codebook $W_{t+1}$ in accordance with:

$$W_{t+1} = [a(\tilde{x}_1), \ldots, a(\tilde{x}_M)]^H \quad (33)$$

Figure 6:
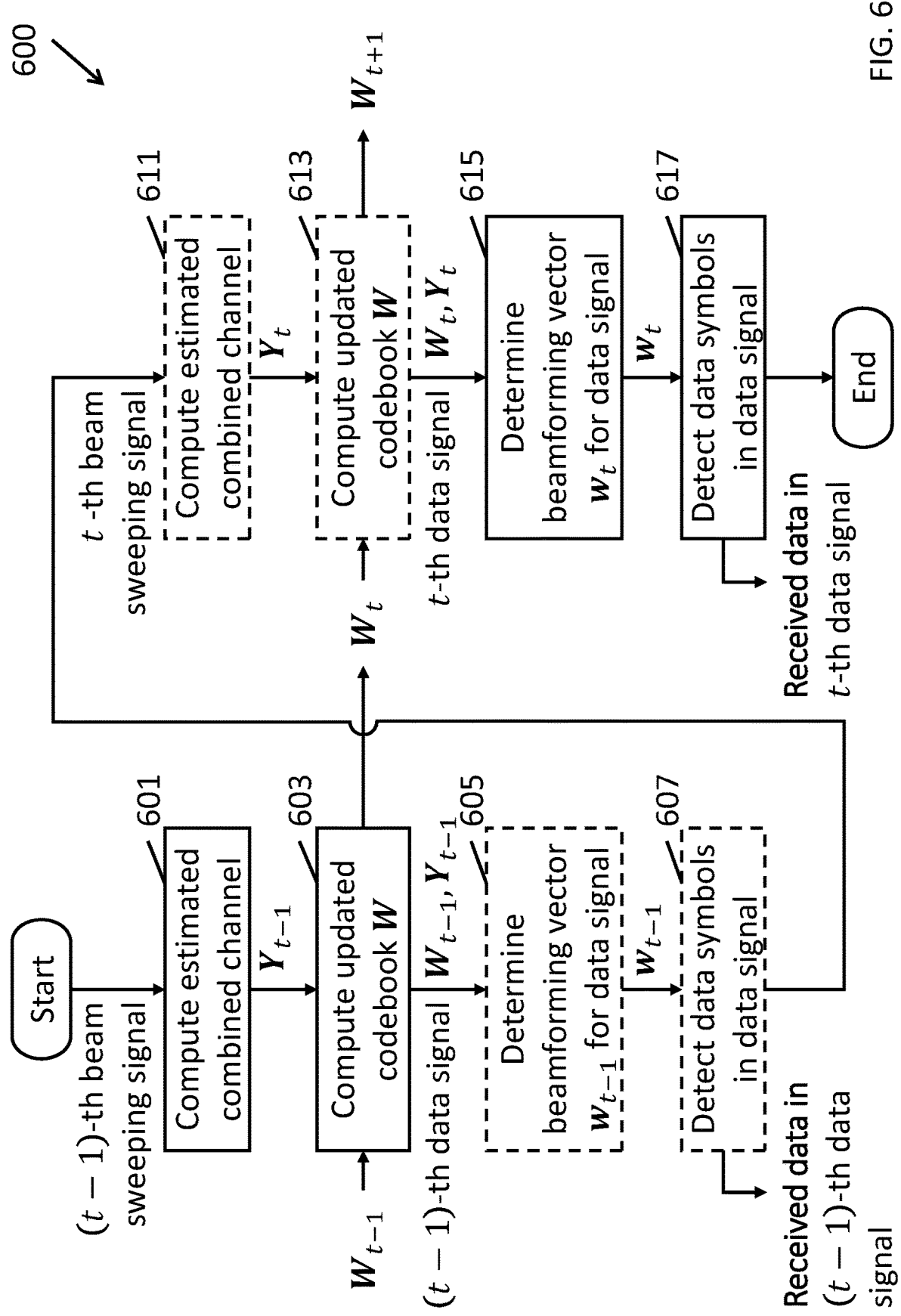
FIG. 6 is a flow chart of a method for updating a codebook and receiving a signal according to one embodiment of the present disclosure.

FIG. 6 is a flow chart of a method for updating a codebook and receiving a signal according to one embodiment of the present disclosure. In the embodiment shown in FIG. 6, operations for receiving a beam sweeping signal during a (t−1)-th period or previous period, computing an updated codebook for the following period, e.g., the t-th period or "current period" and using the updated codebook for determining a beamforming vector receiving a data signal for the current period (the t-th period).

As shown in FIG. 6, in operation 601, during a (t−1)-th period, a radio transceiver (e.g., the radio transceiver 10 of the mobile station 100) receives a (t−1)-th directional electromagnetic beam sweeping signal at an antenna array (e.g., antenna array 120) during a beam sweeping period (e.g., a (t−1)-th beam sweeping period of the (t−1)-th period) and computes an estimated combined channel $Y_{t-1}$ (e.g., using the channel estimator 16) from the received beam sweeping signal. In operation 603, the radio transceiver computes an updated beamforming codebook $W_t$ based on the estimated combined channel $Y_{t-1}$ and the beamforming codebook $W_{t-1}$ for the (t−1)-th period, using the systems and methods described above, such as in the embodiments illustrated in FIGS. 4 and 5. In a manner similar to that of operation 603, the updated current beamforming codebook $W_t$ for the current period t may then be used in operation 613 to compute a next beamforming codebook $W_{t+1}$ for the next period (t+1), as described in more detail below.

As shown in FIG. 6, in operation 605, during a (t−1)-th data reception period, the radio transceiver may determine a beamforming vector $w_{t-1}$ for a directional electromagnetic data signal received at the same antenna array (e.g., antenna array 120) based on the beamforming codebook $W_{t-1}$ computed in an earlier period (e.g., the (t−2)-th period). Approaches for determining a beamforming vector will be described in more detail below with respect to operation 615. In operation 607, using the determined beamforming vector (e.g., as a channel state information parameter), the detector 14 detects the data symbols in the received directional electromagnetic data signal, and the decoder 18 may decode the data in the received data symbols.

In the embodiment shown in FIG. 6, computing a previous estimated combined channel 601, computing an updated current codebook 603, determining a previous beamforming vector 605, and detecting previous data symbols 607 are all performed during a previous period or (t−1)-th period (or first period). FIG. 6 further depicts operations 611, 613, 615, and 617 performed during a current period or t-th period (or second period) after the previous period (e.g., immediately following the (t−1)-th period).

Referring to FIG. 6, in operation 611, during a t-th period or current period, the radio transceiver receives a t-th directional electromagnetic beam sweeping signal at the antenna array (e.g., the same antenna array 120 used during the (t−1)-th period) during another beam sweeping period (e.g., a t-th beam sweeping period of the t-th period) and computes an estimated combined channel $Y_t$ (e.g., using the channel estimator 16) for the current period from the received beam sweeping signal. In operation 613, the radio transceiver computes an updated beamforming codebook $W_{t+1}$ for a next period (e.g., (t+1)-th period) based on the current estimated combined channel $Y_t$ and the current beamforming codebook $W_t$ for the t-th period, using the systems and methods described above, such as in the embodiments illustrated in FIGS. 4 and 5. In the embodiment shown in FIG. 6, the current beamforming codebook $W_t$ used in operation 613 and operation 615 is the codebook that was computed during the previous (t−1)-th period in operation 603.

In operation 615, during a t-th data reception period, the radio transceiver may determine a beamforming vector $w_t$ for a directional electromagnetic data signal (or t-th data signal) received at the same antenna array (e.g., antenna array 120) based on the current beamforming codebook $W_t$ computed in an earlier period (e.g., which was computed during the previous period or (t−1)-th period).

Approaches for determining the beamforming vector for the received directional electromagnetic data signal include: selecting a beamforming vector for data reception from the current beamforming codebook $W_t$ for the current period t without performing channel estimation; and calculating a beamforming vector for data reception explicitly based on a recovered analog channel of the directional electromagnetic data signal, where the analog channel may be recovered based on the current beamforming codebook $W_t$ and the estimate of the current combined channel $Y_t$ for the current period t. In embodiments where the beamforming vector is calculated explicitly based on the recovered analog channel for the current period t, the updated beamforming codebook $W_t$ can be used with various channel recovery techniques such as algorithms based on least square and/or compressive sensing.

In operation 617, using the determined beamforming vector for the current period t (e.g., as a channel state information parameter), the detector 14 detects the data symbols in the received t-th directional electromagnetic data signal, and the decoder 18 may decode the data in the received data symbols.

By updating the beamforming codebook based on beamforming signals from a recent beam sweeping period (e.g., the immediately previous beam sweeping period), aspects of embodiments of the present disclosure combat poor link budget by improving the quality (e.g. signal to noise ratio) of the reception and decoding of the received directional electromagnetic data signal, whether by selecting a beamforming vector for data reception from the beamforming codebook $W_{t+1}$ without performing channel estimation or by calculating a beamforming vector for data reception explicitly based on channel estimation and the beamforming codebook $W_{t+1}$.

For the sake of clarity, while each period will generally include both a beam sweeping period and a data reception period, embodiments of the present disclosure are not limited thereto. For example, in the embodiment shown in FIG. 6, the previous or (t−1)-th period may include a beam sweeping period but may exclude a data reception period and the current or t-th period may include a data reception period and may exclude a beam sweeping period. Accordingly, FIG. 6 shows operations 605, 607, 611, and 613 using dotted lines to indicate that they are optional. In addition, while FIG. 6 shows that the updated codebook for the next period is computed before determining a beamforming vector for a data signal of the current period, embodiments of the present disclosure are not limited thereto. For example, in some embodiments, the updated codebook for the next period is computed after determining the beamforming vector for the data signal of the current period.

Accordingly, aspects embodiments of the present disclosure relate to systems and methods for updating a beamforming codebook to improve analog beamforming gain by aligning a beamforming vector of the beamforming codebook to an estimated dominant angle-of-arrival of a received signal. Some aspects of embodiments of the present disclosure relate to systems and methods for computing the estimated dominant angle-of-arrival. Some aspects of embodiments of the present disclosure relate to computing the remaining angles-of-arrival for the remaining beamforming vectors of the codebook based on the estimated dominant angle-of-arrival.

While aspects of embodiments of the present disclosure are described above with respect to linear antenna arrays, embodiments of the present disclosure are not limited thereto and may be adapted to antenna arrays having different shapes. For example, in the case of a planar antenna array, antenna elements may be spaced apart along two dimensions. In such embodiments, the received directional signal may be considered to have an angle-of-arrival (AoA) and a zenith angle-of-arrival (ZoA). Likewise, each of the beamforming vectors of the codebook may also have an AoA and a ZoA. In the embodiments shown in FIGS. 2A, 2B, and 2C, each beamforming vector was associated with a sector or range of angles. In a similar way, each beamforming vector in the case of a planar array may be associated with a solid angle of potential combinations of AoA and ZoA. The methods for calculating an estimated dominant AoA and ZoA and a codebook may be adapted, as would be understood to one of skill in the art, to apply to planar arrays. For example, supposing that a planar array has antenna elements arranged in a rectangular grid with $N_x$ rows and $N_y$ columns, and under an assumption that the antenna elements are spaced apart at a distance of half of the wavelength of the carrier, then the antenna response vector $a(\theta,\phi)$ may be written as:

$$a(\theta,\phi)=a_x(\theta,\phi)\otimes a_y(\theta,\phi) \quad (34)$$

where $\otimes$ denotes a Kronecker product, and $$a_x(\theta,\phi) = \begin{bmatrix} e^{j0\sin(\theta)\cos(\phi)} \\ \vdots \\ e^{j(N_x-1)\sin(\theta)\cos(\phi)} \end{bmatrix}, \quad (35)$$

$$a_y(\theta,\phi) = \begin{bmatrix} e^{j0\sin(\theta)\sin(\phi)} \\ \vdots \\ e^{j(N_y-1)\sin(\theta)\sin(\phi)} \end{bmatrix}$$

where the computation of an updated beamforming codebook W may proceed in a substantially similar manner to that described above, but using the antenna response vector $a(\theta,\phi)$ for a planar array instead of the antenna response vector $a(\theta)$ for a linear array.

The term "processing circuit" is used herein to mean any combination of hardware, firmware, and software, employed to process data or digital signals. Processing circuit hardware may include, for example, radio baseband processors (BPs or BBPs), application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the present disclosure.

The terminology used herein is for the purpose of describing particular embodiments only and is not intended to be limiting of the disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of updating a beamforming codebook comprising:

receiving a first directional electromagnetic signal at an antenna array of a wireless communication device;

estimating, by a processing circuit of the wireless communication device, a dominant angle-of-arrival (AoA) of the first directional electromagnetic signal based on a first beamforming codebook comprising two or more beamforming vectors corresponding to different angles-of-arrival;

computing, by the processing circuit, one or more remaining angles-of-arrival spaced apart from the estimated dominant angle-of-arrival;

updating, by the processing circuit, the first beamforming codebook based on the estimated dominant angle-of-arrival and the one or more remaining angles-of-arrival to construct an updated beamforming codebook comprising an updated beamforming vector aligned with the estimated dominant angle-of-arrival;

receiving, at the antenna array during a current period, a second directional electromagnetic signal comprising data symbols;

determining a beamforming vector for data reception of the second directional electromagnetic signal based on the updated beamforming codebook; and detecting, by the processing circuit, the data symbols in the second directional electromagnetic signal based on the determined beamforming vector.

2. The method of claim 1, wherein the updated beamforming codebook consists of two beamforming vectors and the number of antenna elements $N_R$ in the antenna array is even, wherein the the first beamforming codebook W comprises:

$$W = [W_1 \ldots W_J] \in \mathcal{C}^{2 \times N_R}$$

$$W_i = C_i W_1 \in \mathcal{C}^{2 \times 2} \text{ for } i=1, \ldots, J = N_R/2$$

for some constants $C_i$, wherein the estimating the dominant AoA $\tilde{x}_1$ of the first directional electromagnetic signal comprises computing:

$$\tilde{x}_1 = \angle(\hat{\underline{h}}_2 \hat{\underline{h}}_1^H)$$

where $$W_1^H Y = \begin{bmatrix} \hat{\underline{h}}_1 \\ \hat{\underline{h}}_2 \end{bmatrix}$$

and $$W_1 = W(1:2, 1:2) \in \mathcal{C}^{2 \times 2}$$

where Y is an estimated combined channel, $\hat{\underline{h}}_1$ and $\hat{\underline{h}}_2$ are estimated analog channels corresponding to two antenna elements of the antenna array, and $\mathcal{C}$ is a constant, wherein the one or more remaining angles-of-arrival consists of one beamforming vector, wherein the antenna array has an even number of antenna elements, and wherein the remaining angle-of-arrival $\tilde{x}_2$ is computed in accordance with $\tilde{x}_2 = \tilde{x}_1 + \pi$, and wherein the updated beamforming codebook $W_t$ is computed in accordance with $$W_t = \begin{bmatrix} a(\tilde{x}_1)^H \\ a(\tilde{x}_1 + \pi)^H \end{bmatrix},$$

where a is an antenna response vector.

3. The method of claim 1, wherein the updated beamforming codebook comprises three or more beamforming vectors.

4. The method of claim 3, wherein the estimating the dominant AoA $\tilde{x}_1$, of the first directional electromagnetic signal comprises computing:

$$\tilde{x}_1 = \underset{x \in \mathcal{N}(b^*)}{\mathrm{argmax}} \frac{\varphi(x)^H Y Y^H \varphi(x)}{\|\varphi(x)\|^2},$$

$$\varphi(\bar{x}_i) = W a(\bar{x}_i) \in \mathcal{C}^M,$$

$$a(\bar{x}_i) = [e^{j0\bar{x}_i}, \ldots, e^{j(N_R-1)\bar{x}_i}]^T \in \mathcal{C}^{N_R}$$

where Y is an estimated combined channel, $\varphi(x)$ is a basis, $\bar{x}_i$ is a quantized angle of arrival, W is the first beamforming codebook, $a(\bar{x}_i)$ is an antenna response vector at the quantized angle of arrival $\bar{x}_i$, $\mathcal{C}^M$ is a vector of M complex values, where M is a number of search angles, $\mathcal{C}^{N_R}$ is a vector of $N_R$ complex values, where $N_R$ is a number of antenna elements in the antenna array, and $\mathcal{N}(b^*)$ is a set of angles in a neighborhood around a selected search angle $b^*$.

5. The method of claim 4, wherein the selected search angle $b^*$ is selected in accordance with:

$$b^* = \underset{m}{\mathrm{argmax}}\, \underline{y}_m \underline{y}_m^H,$$

where $$Y = \begin{bmatrix} \underline{y}_1 \\ \vdots \\ \underline{y}_M \end{bmatrix},$$

wherein the set of angles comprises M search angles and m is an index of a search angle among the M search angles.

6. The method of claim 4, wherein the selected search angle $b^*$ is selected in accordance with an estimated dominant angle-of-arrival of a third directional electromagnetic signal.

7. The method of claim 4, wherein the set of angles in the neighborhood $\mathcal{N}(b^*)$ around the selected search angle $b^*$ is computed by:

$$\mathcal{N}(b^*) = \{x: x = b^* + \Delta l, l = N, \ldots, 0, \ldots N\}$$

where N is a positive integer controlling a number of angles in $\mathcal{N}(b^*)$ to $2N+1$ and where $\Delta$ is an angular resolution of the angles in $\mathcal{N}(b^*)$.

8. The method of claim 3, wherein a number of antenna elements $N_R$ in the antenna array is an integer multiple of a number of beamforming vectors M in the updated beamforming codebook, and
wherein the one or more remaining angles-of-arrival $\bar{x}_i$ are computed in accordance with:

$$\tilde{x}_i = \tilde{x}_i + \frac{2\pi}{M}(i-1), i = 2, \ldots, M$$

where $\tilde{x}_1$ is the estimated dominant angle-of-arrival of the first directional electromagnetic signal.

9. The method of claim 3, wherein a number of antenna elements $N_R$ in the antenna array is not an integer multiple of a number of beamforming vectors M in the updated beamforming codebook, and
wherein the one or more remaining angles-of-arrival are selected from a constraint set of angles $I(\tilde{x}_1)$, where $$I(\tilde{x}_1) = \left\{ x : x = \tilde{x}_1 + \frac{2\pi}{N_R}n, n = 0, \ldots, N_R - 1 \right\}.$$

10. The method of claim 1, wherein the determining the beamforming vector for data reception of the second directional electromagnetic signal comprises selecting the beamforming vector for data reception from the updated beamforming codebook without performing channel estimation.

11. The method of claim 1, wherein the determining the beamforming vector for data reception of the second directional electromagnetic signal comprises explicitly calculating the beamforming vector based on a channel estimation on the second directional electromagnetic signal and based on the updated beamforming codebook.

12. A wireless communication device configured to update a beamforming codebook, the wireless communication device comprising:
an antenna array;
a processing circuit configured to receive signals from the antenna array and configured to:
receive a first directional electromagnetic signal at the antenna array;
estimate a dominant angle-of-arrival (AoA) of the first directional electromagnetic signal based on a beamforming codebook comprising two or more beamforming vectors corresponding to different angles-of-arrival;
compute one or more remaining angles-of-arrival spaced apart from the estimated dominant angle-of-arrival;
update the beamforming codebook based on the estimated dominant angle-of-arrival and the one or more remaining angles-of-arrival to construct an updated beamforming codebook comprising an updated beamforming vector aligned with the estimated dominant angle-of-arrival;
receive, at the antenna array during a current period, a second directional electromagnetic signal comprising data symbols;
determine a beamforming vector for data reception of the second directional electromagnetic signal based on the updated beamforming codebook; and
detect the data symbols in the second directional electromagnetic signal based on the determined beamforming vector.

13. The wireless communication device of claim 12, wherein the updated beamforming codebook consists of two beamforming vectors and the number of antenna elements $N_R$ in the antenna array is even,
wherein the beamforming codebook $\underline{W}$ comprises:

$$W = [W_1 \ldots W_J] \in \mathcal{C}^{2 \times N_R}$$

$$W_i = C_i W_1 \in \mathcal{C}^{2 \times 2} \text{ for } i = 1, \ldots, J = N_R/2$$

for some constants $C_i$,
wherein the processing circuit is configured to estimate the dominant AoA $\tilde{x}_1$ of the first directional electromagnetic signal by computing:

$$\tilde{x}_1 = \angle(\hat{h}_2 \hat{h}_1^H)$$

where $$W_1^H Y = \begin{bmatrix} \hat{\underline{h}}_1 \\ \hat{\underline{h}}_2 \end{bmatrix}$$

and $$W_1 = W(1:2, 1:2) \in \mathcal{C}^{2 \times 2}$$

where Y is an estimated combined channel, $\hat{\underline{h}}_1$ and $\hat{\underline{h}}_2$ are estimated analog channels corresponding to two antenna elements of the antenna array, and $\mathcal{C}$ is a constant, wherein the one or more remaining angles-of-arrival consists of one beamforming vector, wherein the antenna array has an even number of antenna elements, and wherein the remaining angle-of-arrival $\tilde{x}_2$ is computed in accordance with $\tilde{x}_2 = \tilde{x}_1 + \pi$, and wherein the updated beamforming codebook $W_t$ is computed in accordance with $$W_t = \begin{bmatrix} a(\tilde{x}_1)^H \\ a(\tilde{x}_1 + \pi)^H \end{bmatrix},$$

where $\alpha$ is an antenna response vector.

14. The wireless communication device of claim 12, wherein the updated beamforming codebook comprises three or more beamforming vectors.

15. The wireless communication device of claim 14, wherein the processing circuit is configured to estimate the dominant AoA $\tilde{x}_1$ of the first directional electromagnetic signal by computing:

$$\tilde{x}_1 = \underset{x \in \mathcal{N}(b^*)}{\operatorname{argmax}} \frac{\varphi(x)^H Y Y^H \varphi(x)}{\|\varphi(x)\|^2},$$

$$\varphi(\tilde{x}_i) = W a(\tilde{x}_i) \in \mathcal{C}^M,$$

$$a(\tilde{x}_i) = \begin{bmatrix} e^{j0\tilde{x}_i}, \ldots, e^{j(N_R - 1)\tilde{x}_i} \end{bmatrix}^T \in \mathcal{C}^{N_R}$$

where Y is an estimated combined channel, φ(x) is a basis, $\overline{x}_i$ is a quantized angle of arrival, W is the first beamforming codebook, $a(\overline{x}_i)$ is an antenna response vector at the quantized angle of arrival $\overline{x}_i$, $\mathcal{C}^M$ is a vector of M complex values, where M is a number of search angles, $\mathcal{C}^{N_R}$ is a vector of $N_R$ complex values, where $N_R$ is a number of antenna elements in the antenna array, and $\mathcal{N}(b^*)$ is a set of angles in a neighborhood around a selected search angle $b^*$.

16. The wireless communication device of claim 15, wherein the processing circuit is configured to select the selected search angle $b^*$ in accordance with:

$$b^* = \underset{m}{\operatorname{argmax}} \underline{y}_m \underline{y}_m^H,$$

where $$Y = \begin{bmatrix} \underline{y}_1 \\ \vdots \\ \underline{y}_M \end{bmatrix},$$

wherein the set of angles comprises M search angles and m is an index of a search angle among the M search angles.

17. The wireless communication device of claim 15, wherein the processing circuit is configured to select the selected search angle $b^*$ in accordance with an estimated dominant angle-of-arrival of a third directional electromagnetic signal.

18. The wireless communication device of claim 15, wherein the processing circuit is configured to compute the set of angles in the neighborhood $\mathcal{N}(b^*)$ around the selected search angle $b^*$ by:

$$\mathcal{N}(b^*) = \{x : x = b^* + \Delta l, l = -N, \ldots, 0, \ldots N\}$$

where N is a positive integer controlling a number of angles in $\mathcal{N}(b^*)$ to 2N+1 and where $\Delta$ is an angular resolution of the angles in $\mathcal{N}(b^*)$.

19. The wireless communication device of claim 14, wherein a number of antenna elements $N_R$ in the antenna array is an integer multiple of a number of beamforming vectors M in the updated beamforming codebook, and
wherein the one or more remaining angles-of-arrival $\tilde{x}_i$ are computed in accordance with:

$$\tilde{x}_i = \tilde{x}_i + \frac{2\pi}{M}(i - 1), i = 2, \ldots, M$$

where $\tilde{x}_1$ is the estimated dominant angle-of-arrival of the first directional electromagnetic signal.

20. The wireless communication device of claim 14, wherein a number of antenna elements $N_R$ in the antenna array is not an integer multiple of a number of beamforming vectors M in the updated beamforming codebook, and
wherein the one or more remaining angles-of-arrival are selected from a constraint set of angles $I(\tilde{x}_1)$, where $$I(\tilde{x}_1) = \left\{ x : x = \tilde{x}_1 + \frac{2\pi}{N_R} n, n = 0, \ldots, N_R - 1 \right\}.$$

21. The wireless communication device of claim 12, wherein the processing circuit is configured to determine the beamforming vector for data reception of the second directional electromagnetic signal by selecting the beamforming vector for data reception from the updated beamforming codebook without performing channel estimation.

22. The wireless communication device of claim 12, wherein the determining the beamforming vector for data reception of the second directional electromagnetic signal comprises explicitly calculating the beamforming vector based on a channel estimation on the second directional electromagnetic signal and based on the updated beamforming codebook.

* * * * *